United States Patent [19]

Sugiura

[11] Patent Number: 5,010,120
[45] Date of Patent: Apr. 23, 1991

[54] SOLID ADHESIVE COMPOSITION
[75] Inventor: Koji Sugiura, Ichinomiya, Japan
[73] Assignee: Sakura Color Products Corporation, Osaka, Japan
[21] Appl. No.: 548,264
[22] Filed: Jul. 5, 1990
[30] Foreign Application Priority Data
  Jul. 5, 1989 [JP]  Japan .................................. 1-173715
[51] Int. Cl.$^5$ .............................................. C08J 9/32
[52] U.S. Cl. .................................... 523/219; 523/218; 524/394; 524/522
[58] Field of Search ................ 523/219, 218; 524/394, 524/522
[56] References Cited
U.S. PATENT DOCUMENTS
  3,857,731 12/1974 Merrill, Jr. et al. ............. 428/314.4

Primary Examiner—Paul R. Michl
Assistant Examiner—John J. Guarriello
Attorney, Agent, or Firm—Larson and Taylor

[57] ABSTRACT

The invention provides a solid adhesive composition useful for temporary and repeated fixation of an article on a surface which comprises about 5.0 to about 45 weight percent of an acrylic resin having a glass transition point of −10° C. or below about 0.1 to about 2.0 weight percent of a polyacrylic acid-based thickening agent, about 5.0 to about 30 weight percent of a fatty acid soap, about 0.1 to about 2.0 weight percent of an alkali hydroxide, about 0.1 to about 10 weight percent of microspheres with an average grain size of about 10 to about 200 μm and about 2.0 to about 60 weight percent of water.

7 Claims, No Drawings

SOLID ADHESIVE COMPOSITION

FIELD OF THE INVENTION

This invention relates to a solid paste or adhesive composition capable of removably bonding an adherend for temporary and repeated fixation or binding of a piece of paper, synthetic polymer sheet and the like on a surface.

BACKGROUND OF THE INVENTION

As the solid pastes or adhesives so far proposed, there may be mentioned solid pastes containing, as essential components thereof, a water-soluble adhesive, a gelling agent such as a soap, an emulsion substance and water (Japanese Kokai Tokkyo Koho No.34342/1979) and solid adhesive containing, as a main component thereof, a water-soluble complex formed from a solid anionic surfactant and a synthetic resin emulsion (Japanese Kokai Tokkyo Koho No.43431/1973), etc.

In these solid pastes, however, coagulation or flocculation has occurred or the emulsion has been broken, so that the pastes make the surface coated therewith uneven and/or leave solid particles not adhered thereto. Another problem lies in that a high viscosity is encountered in the step of melting materials in the production process, making it difficult to handle the melt, for example, to pour the same into molds. Furthermore, these pastes are not suited for repeated use hence unsuited for temporary or repeated binding or fixation of paper and similar materials.

In addition to the solid adhesives mentioned above, a pressure-sensitive sheet-like material capable of being repeatedly used, which comprises adhesive, elastomer-like copolymer microspheres has been proposed (Japanese Kokai Tokkyo Koho No.2736/1975). Such material is, however, weak in adherence. It is tacky on the adhesive-coated surface, so that it may readily become soiled and possibly lose much of its tackiness.

SUMMARY OF THE INVENTION

As a result of intensive investigations made in an attempt to solve or mitigate the problems mentioned above, the present inventor has found that a certain solid composition increases the bonding strength with the increase of the pressure applied and shows a characteristic suited for repeated fixation of articles on a surface to which the composition is applied. Based on this finding, the present invention has now been completed.

The invention thus provides a solid adhesive composition suited for repeated fixation of articles on a surface which comprises 5.0 to 45 weight percent of an acrylic resin having a glass transition temperature of $-10°$ C. or below, 0.1 to 2.0 weight percent of a polyacrylic acid-based viscosity regulating agent, 5.0 to 30 weight percent of a fatty acid soap, 0.1 to 2.0 weight percent of an alkali hydroxide, 0.1 to 10 weight percent of microspheres with an average grain size of 10 to 200 μm and 2.0 to 60 weight percent of water.

DETAILED DESCRIPTION OF THE INVENTION

The term "acrylic resin" as used herein includes homo- and copolymers of acrylic acid alkyl esters, such as butyl acrylate, ethyl acrylate, 2-ethylhexyl acrylate, etc. which have a glass transition temperature equal to or below $-10°$ C. The acrylic resin preferably has a viscosity within the range of 50 to 15,000 cps measured as an emulsion when producing the composition of the invention. More specifically, those commercial products can be used which are available under the trade names of AE-332, AE-812, AE-330 and AE-923 (all available from Japan Synthetic Rubber Co., Ltd.).

The polyacrylic acid-based viscosity regulating agents to be used in the invention comprises known water-soluble acrylc resins having a viscosity of about 100 to 15,000 cps (5% aqueous solution, 25° C.), such as polyacrylic acid, polyacrylic acid sodium salt, polyacrylic acid ammonium salt, etc. As specific examples, commercial products which are available under the trade names of Junlon PW-110, Rheogic 250H and Rheogic 306L (all available from Nihon Junyaku Co., Ltd.)

The fatty acid soap usable in the invention serves as a base material for solidifying the paste composition of the invention and prevents the coagulation of emulsion particles and the breakage of the emulsion during gelation. Examples of fatty acid soaps are sodium laurate, sodium myristate, sodium palmitate, sodium stearate and the like. These fatty acid soaps may be used singly or in combination of two or more species.

Examples of the alkali hydroxides are sodium hydroxide and potassium hydroxide. The alkali hydroxide functions as melt viscosity lowering agent.

Usable as the microspheres in the composition of the invention are various inorganic or organic microspheres, such as inorganic microspheres made of silica, borosilate glass and the like, and organic microspheres made of an acrylic resin, a silicone resin and the like. The microspheres preferably have an average particle size of 10 to 200 μm.

For increasing their dispersibility in the other components of the solid adhesive composition of the invention, the microspheres preferably have a specific gravity of about 0.01 to about 1.

A specific gravity of the microspheres within the above range can be attained, for example, by making them hollow. Hollow microspheres make the solid paste according to the invention very practical as compared with the prior art pastes.

The amounts of the above-mentioned acrylic resin, polyacrylic acid-based viscosity regulating agent, fatty acid soap, alkali hydroxide, microspheres and water in the solid paste according to the invention are usually in the range of about 5.0 to about 45 weight percent, about 0.1 to about 2.0 weight percent, about 5.0 to about 30 weight percent, about 0.1 to about 2.0 weight percent, about 0.1 to about 10 weight percent and about 2.0 to about 60 weight percent, respectively, and preferably in the range of about 15 to about 40 weight percent, about 0.1 to about 1.0 weight percent, about 10 to about 28 weight percent, about 0.2 to about 1.0 weight percent, about 0.5 to about 5.0 weight percent and about 7.0 to about 55 weight percent, respectivley.

The method of producing the solid paste according to the invention is not limited to any particular one. Thus, for example, a method employable comprises stirring an emulsion of the acrylic resin together with the polyacrylic acid-based viscosity regulating agent, fatty acid soap, alkali hydroxide, microspheres and water with heating, pouring the resulting mixture into molds (the same containers as used for the conventional solid adhesive) and cooling the mixture for solidification. To be in more detail, the stirring for blending may be conducted generally at a temperature of about 40° to about 100° C.

for about 15 to about 60 minutes using a propeller mixer, for instance. After pouring into molds, the mixture may be solidified by cooling.

The use in the paste producing stage, of an acrylic resin having a low glass transition temperature in the form of an emulsion in combination with a polyacrylic acid-based viscosity regulating agent and a fatty acid soap contributes to effective prevention of coagulation and demulsification, which leads to solidification in a stable emulsion state. As a result, the solid paste or adhesive composition according to the invention shows properties required of a solid paste, for temporary and repeated binding of sheet of paper, polymers, etc. giving a smooth and uniform coated surface.

The addition of the alkali hydroxide results in a reduced melt viscosity of the mixture, thus facilitating molding of the mixture and greatly simplifying the handling of the mixture in the composition production process.

The use of the microspheres markedly reduces the tack of the coated surface and of the surface after the removal of paper or polymer sheet whereby the attachment of soil can be prevented and the bonding strength can be retained when a piece of paper or a polymer sheet is again adhered thereon.

Furthermore, the presence of the microspheres causes a change in bonding strength, which is dependent on the application pressure, in bonding an article coated with the paste to a base or substrate, for example to the surface of a wall. In other words, stronger adhesion can be attained by increasing the application pressure to the adhesive between the article and substrate. Even those articles that are heavy to a certain extent can be fixed temporarily as well.

Furthermore, the thickness of the paste layer can be increased so that even in bonding an article such as sheet of paper or the like to a wall or substrate having a slightly uneven surface, the microspheres can enter cavities or depressions to attain article-to-substrate bonding without any substantial decrease in bonding strength.

The solid adhesive composition according to the invention is quick-drying and very excellent in bonding strength, tackiness and repeated fixation of artilces such as piece of paper, sheet of polymer, etc.

EXAMPLES

The following examples are further illustrative of the present invention.

EXAMPLES 1 TO 6 AND COMPARATIVE EXAMPLES 1 to 8

Solid compositions consisting of the components given in Table 1 (Examples 1 to 6) and Table 2 (Comparative Examples 1 to 8) were prepared in the following manner.

In each example, ingredient materials specified in Table 1 or Table 2 were heated to 80° C. and stirred for 30 minutes to give a uniform mixture, which was then poured into molds. Five minutes of cooling with water gave the desired product.

The solid product obtained in each example was subjected to the following performance tests. The results obtained are shown in Table 3.

[Performance tests]

Applicability

Each sample was applied onto a woodfree paper and the coated surface was evaluated for smoothness. When the coated surface was even and smooth without occurrence of any work-ups, the sample was given the grade A. When the sample gave an uneven coat layer with solid particles formed, it was given the grade B.

Filling behavior

When the mixture could be poured into molds with each in the production process in each example, the grade A was given. When the filling was difficult because of a high viscosity, the grade B was given.

Solidification

When solidification proceeded in a satisfactory manner after filling into molds, the grade A was given. In case of unsatisfactory solidification, the grade B was given.

Tack

When the coated surface was tack-free in the above applicability test, the grade A was given. When the surface was tacky, the grade B was given.

Stability

When the emulsion after solidification was stable, the grade A was given. When the emulsion underwent coagulation or demulsification, the grade B was given.

Pressure sensitive adhesion

When the bonding strength increased with the increase of the application pressure, the grade A was given In case of no substantial increase, the grade B was given.

The numerical values in Table 1 and Table 2 are in percent by weight. The symbols used in the tables have the meanings given below. The emulsions I-a to I-f were used as acrylate ester resin sources.

I-a: Acrylate ester resin, trade name "AE-332" (Japan Synthetic Rubber Co., Ltd.; glass transition temperature (Tg)=$-10°$ C.)

I-b: Acrylate ester resin, trade name "AE-812" (Japan Synthetic Rubber Co., Ltd.; Tg=$-24°$ C.)

I-c: Acrylate ester resin, trade name "AE-330" (Japan Synthetic Rubber Co., Ltd.; Tg=$-50°$ C.)

I-d: Acrylate ester resin, trade name "AE-923" (Japan Synthetic Rubber Co., Ltd.; Tg=$-62°$ C.)

I-e: Acrylate ester resin, trade name "AE-123" (Japan Synthetic Rubber Co., Ltd.; Tg=$58°$ C.)

I-f: Acrylate ester resin, trade name "AE-315" (Japan Synthetic Rubber Co., Ltd.; Tg=$10°$ C.)

II-a: Polyacrlic acid, trade name "Junlon PW-110" (Nihon Junyaku Co., Ltd.)

II-b: Polyacrlic acid sodium salt, trade name "Rheogic 250H" (Nihon Junyaku Co., Ltd.)

II-c: Polyacrlic acid ammonium salt, trade name "Rheogic 306L" (Nihon Junyaku Co., Ltd.)

II-d: Methylcellulose, trade name "Marpolose A" (Matsumoto Yushi-Seiyaku Co., Ltd.)

II-e: Bentonite type, trade name "Bentone LT" (Wilbur-Ellis Company)

III-a: Sodium myristare

III-b: Sodium laurate

III-c: Sodium palmitate

III-d: Sodium stearate

IV-a: Potassium hydroxide

IV-b: Sodium hydroxide

V-a: Hollow microspheres made of borosilicate glass, trade name "Q-Cel 300" (Asahi Glass Co., Ltd.)

V-b: Hollow capsules made of vinylidene chloride-acrylonitrile copolymer, trade name "Expancel" (Japan Fillite Co., Ltd.)

V-c: Hollow microspheres made of silica, trade name "Nipcel K-133" (Nippon Silica Industrial Co., Ltd.)

VI : Water

TABLE 1

| Example | 1 | 2 | 3 | 4 | 5 | 6 |
|---|---|---|---|---|---|---|
| I-a | 36.2 | | | | | |
| I-b | | 36.4 | | | | |
| I-c | | | 40.0 | | | |
| I-d | | | | 15.0 | 38.5 | 38.8 |
| II-a | 0.1 | 0.5 | 1.0 | | | |
| II-b | | | | | | |
| II-c | | | | 0.2 | 0.5 | 0.9 |
| III-a | 2.5 | | | 5.2 | 2.0 | |
| III-b | | 3.2 | | 8.6 | | |
| III-c | | 22.6 | 13.3 | 9.6 | 15.0 | 1.3 |
| III-d | 7.5 | | 5.8 | 8.5 | 2.5 | 25.0 |
| IV-a | | 1.0 | | 0.2 | | |
| IV-b | 0.2 | | 0.3 | | 0.5 | 1.0 |
| V-a | 0.5 | | | 4.6 | 3.0 | |
| V-b | | 4.5 | | | | |
| V-c | | | 3.5 | | | 5.0 |
| VI | 53.0 | 35.0 | 27.7 | 51.3 | 40.0 | 28.0 |

TABLE 2

| Comparative Example | 1 | 2 | 3 | 4 | 5 | 6 | 7 | 8 |
|---|---|---|---|---|---|---|---|---|
| I-a | | | 33.3 | 33.3 | | | | |
| I-b | | | | | 39.9 | | | |
| I-c | | | | | | 32.4 | | 41.0 |
| I-d | | | | | | | 36.7 | |
| I-e | 35.0 | | | | | | | |
| I-f | | 35.0 | | | | | | |
| II-a | 0.5 | 0.5 | | | | | | |
| II-b | | | | | 0.5 | | 0.1 | |
| II-c | | | | | | 1.0 | | 0.2 |
| II-d | | | 3.2 | | | | | |
| II-e | | | | 0.1 | | | | |
| III-a | | | | | 2.0 | | | 0.3 |
| III-b | | | | | 2.9 | 3.2 | 1.1 | |
| III-c | 22.0 | 22.0 | 22.0 | 22.0 | 3.6 | 15.0 | 7.1 | 8.5 |
| III-d | | | | | 8.5 | 2.3 | 6.3 | 2.1 |
| IV-a | | | | | | | 0.2 | |
| IV-b | 0.5 | 0.5 | 2.5 | 2.5 | | | | 0.6 |
| V-a | 4.5 | 4.5 | 3.1 | 3.1 | | | | |
| V-b | | | | | 4.2 | 4.2 | | |
| VI | 37.5 | 37.5 | 35.9 | 39.0 | 38.4 | 41.9 | 48.5 | 47.3 |

TABLE 3

| | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Applicability | A | A | A | A | A | A | — | — | — | — | B | B | B | B |
| Filling | A | A | A | A | A | A | B | B | B | B | B | B | B | B |
| Solidification | A | A | A | A | A | A | B | B | B | B | A | A | A | A |
| Tack | A | A | A | A | A | A | — | — | — | — | — | — | B | B |
| Stability | A | A | A | A | A | A | B | B | B | B | B | B | A | A |
| Pressure sensitive adhesion | A | A | A | A | A | A | — | — | — | — | — | — | B | B |

As is evident from the data shown in Table 3, all solid composition according to the invention showed good results in all tests.

On the contrary, none of the composition of the comparative examples could pass all the tests.

TEST EXAMPLE 1

The solid composition Example 1 and a commercially available tack paper were tested for the relationship between adhesion (holding power) and applied pressure. The results obtained are shown in Table 4.

TABLE 4

| Pressure applied (g/cm²) | Example 1 Adhesion (g/cm²) | Reference Example Adhesion (g/cm²) |
|---|---|---|
| 500 | 120 | 1020 |
| 1000 | 1902 | 1152 |
| 3000 | 3058 | 1502 |
| 5000 | 3178 | 2236 |
| 7000 | 4772 | 2264 |

Note:
Measurement of application pressure-adhesion-A woodfree paper coated with the sample was brought into close contact with a rigid polyvinyl chloride sheet under a given application pressure and the adhesion was measured.

As is evident from the data shown in Table 4, the adhesion significantly increased with the increase in applied pressure with the sample of Example 1. No great changes were observed in the reference example; after arrival at a certain value, the adhesion remained at a relatively low, constant level.

I claim:

1. A solid adhesive composition useful for temporary and repeated fixation of an article on a surface which comprises about 5.0 to about 45 weight percent of an acrylic resin having a glass transition point of −10° C. or below, about 0.1 to about 2.0 weight percent of a polyacrylic acid-based thickening agent, about 5.0 to about 30 weight percent of a fatty acid soap, about 0.1 to about 2.0 weight percent of an alkali hydroxide, about 0.1 to about 10 weight percent of microspheres with an average grain size of about 10 to about 200 μm and about 2.0 to about 60 weight percent of water.

2. A solid adhesive composition as claimed in claim 1, wherein the acrylic resin is a polymer containing, as its constituent monomer, at least of acrylic acid alkyl ester.

3. A solid adhesive composition as claimed in claim 2, wherein the acrylic acid alkyl ester is at least one member of the class consisting of ethyl acrylate, butyl acrylate and 2-ethylhexyl acrylate.

4. A solid adhesive composition as claimed in claim 1, wherein the polyacrylic acid-based viscosity regulating agent is an aqueous solution having a viscosity of about 100 to about 15,000 cps.

5. A solid adhesive composition as claimed in claim 1, wherein the fatty acid soap is at least one member of the class consisting of sodium laurate, sodium myristate, sodium palmitate and sodium stearate.

6. A solid adhesive composition as claimed in claim 1, wherein the microspheres are hollow spheres with a specific gravity of about 0.01 to about 1.

7. A solid adhesive composition as claimed in claim 1 comprising about 15 to about 40 weight percent of an acrylic resin having a glass transition point of −10° C. or below, about 0.1 to about 1 weight percent of a polyacrylic acid-based viscosity regulating agent, about 10 to about 28 weight percent of a fatty acid soap, about 0.2 to about 1 weight percent of an alkali hydroxide, about 0.5 to about 5 weight percent of microspheres with an average grain size of about 10 to about 200 μm and about 7 to about 55 weight percent of water.

* * * * *